United States Patent
Yamamoto et al.

(10) Patent No.: US 9,642,100 B2
(45) Date of Patent: May 2, 2017

(54) WIRELESS COMMUNICATION DEVICE AND TRANSMISSION-POWER CONTROL DEVICE

(71) Applicant: Panasonic Intellectual Property Management Co., Ltd., Osaka (JP)

(72) Inventors: Naotake Yamamoto, Osaka (JP); Yoichi Masuda, Tokyo (JP); Tetsuya Hishikawa, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/773,598

(22) PCT Filed: Feb. 21, 2014

(86) PCT No.: PCT/JP2014/000891
§ 371 (c)(1),
(2) Date: Sep. 8, 2015

(87) PCT Pub. No.: WO2014/147954
PCT Pub. Date: Sep. 25, 2014

(65) Prior Publication Data
US 2016/0044612 A1    Feb. 11, 2016

(30) Foreign Application Priority Data

Mar. 21, 2013   (JP) .................................. 2013-058632

(51) Int. Cl.
*H04W 52/42* (2009.01)
*H04B 7/06* (2006.01)
(Continued)

(52) U.S. Cl.
CPC ............ *H04W 52/42* (2013.01); *H04B 7/061* (2013.01); *H04B 7/0608* (2013.01);
(Continued)

(58) Field of Classification Search
CPC .............................. H04B 7/0608; H04W 52/42
(Continued)

(56) References Cited

U.S. PATENT DOCUMENTS

| 7,515,877 | B2* | 4/2009 | Chen | H04B 7/0613 |
| | | | | 370/332 |
| 8,654,715 | B2* | 2/2014 | Wang | H04B 7/061 |
| | | | | 370/329 |
| 2004/0203541 | A1* | 10/2004 | Coan | H04B 7/0404 |
| | | | | 455/115.1 |

FOREIGN PATENT DOCUMENTS

| EP | 0 917 304 | 5/1999 |
| JP | 3090109 | 9/2000 |

(Continued)

OTHER PUBLICATIONS

International Search Report issued Apr. 8, 2014 in corresponding International Application No. PCT/JP2014/000891.

*Primary Examiner* — John J Lee
(74) *Attorney, Agent, or Firm* — Wenderoth, Lind & Ponack, L.L.P.

(57) ABSTRACT

A wireless communication device has an aim of specifying, when transmitting data to another communication device, an antenna among antennas that can transmit data at a low transmission power. The wireless communication device switches between a first antenna and a second antenna upon transmission of a request signal to the other communication device, and increases or decreases transmission power for transmitting the request signal when switching between the first antenna and the second antenna.

15 Claims, 13 Drawing Sheets

(51) Int. Cl.
*H04W 4/00* (2009.01)
*H04W 52/36* (2009.01)

(52) U.S. Cl.
CPC ......... *H04W 4/005* (2013.01); *H04W 52/367* (2013.01); *Y02B 60/50* (2013.01)

(58) Field of Classification Search
USPC .......................... 455/101, 115.1, 66.1, 277.1
See application file for complete search history.

(56) References Cited

FOREIGN PATENT DOCUMENTS

| | | |
|---|---|---|
| JP | 2005-537759 | 12/2005 |
| JP | 2010-509869 | 3/2010 |
| WO | 2004/023674 | 3/2004 |
| WO | 2008/058219 | 5/2008 |

\* cited by examiner

WIRELESS COMMUNICATION DEVICE AND TRANSMISSION-POWER CONTROL DEVICE

TECHNICAL FIELD

The present invention is related to transmission diversity schemes in wireless communication networks, and in particular to a wireless communication device and wireless communication method that control transmission power when transmitting data to a destination communication device, by using an antenna among a plurality of antennas.

BACKGROUND ART

In recent years, in the field of wireless communication networks, technology has become known by which a communication device uses a plurality of antennas with aims such as increasing communication area or cancelling effects of interference. This is sometimes known as diversity technology.

In a wireless network composed of a master station having a plurality of antennas and a plurality of slave stations, when the master station communicates with the plurality of slave stations, it is necessary to select an antenna from among the plurality of antennas to use to communicate data to a slave station.

At such time, when the master station transmits data to a slave station via an antenna, it is preferable that an antenna having a low transmission power is selected. This allows reduced power consumption by the master station, and suppresses the effect of interference for other networks.

Conventionally, as methods related to determining transmission power, methods have been disclosed by which the magnitude of the reception level of data received by the master station is detected, and transmission power is determined based on the reception level (for example, Patent Literature 1).

CITATION LIST

Patent Literature

[Patent Literature 1] Japanese Patent No. 3090109

SUMMARY OF INVENTION

Technical Problem

However, Patent Literature 1 does not disclose a method by which a communication device having a plurality of antennas transmits data to another communication device using a lower transmission power, and Patent Literature 1 does not disclose a configuration to specify an antenna used to transmit data.

The present invention is achieved in view of the technical problems above, and has an aim of providing a wireless communication device and transmission-power control method that specify an antenna among a plurality of antennas that can transmit data at a lower transmission power when a communication device having a plurality of antennas transmits data to another communication device.

Solution to Problem

A wireless communication device pertaining to an embodiment of the present invention is a wireless communication device comprising: a first antenna and a second antenna for wireless communication with another communication device; a transmitter configured to transmit a request signal to the other communication device via one antenna out of the first antenna and the second antenna; a receiver configured to receive a response signal transmitted from the other communication device, the response signal being transmitted in response to the other communication device receiving the request signal; an antenna controller configured to switch between the first antenna and the second antenna upon the transmitter transmitting the request signal; and a transmission controller configured to increase or decrease a transmission power for the transmitter to transmit the request signal when the antenna controller switches between the first antenna and the second antenna.

Advantageous Effects of Invention

According to the present invention, among a plurality of antennas, an antenna that can transmit data at a lowest transmission power is specified when transmitting data to another communication device.

EMBODIMENTS

Figure 1:
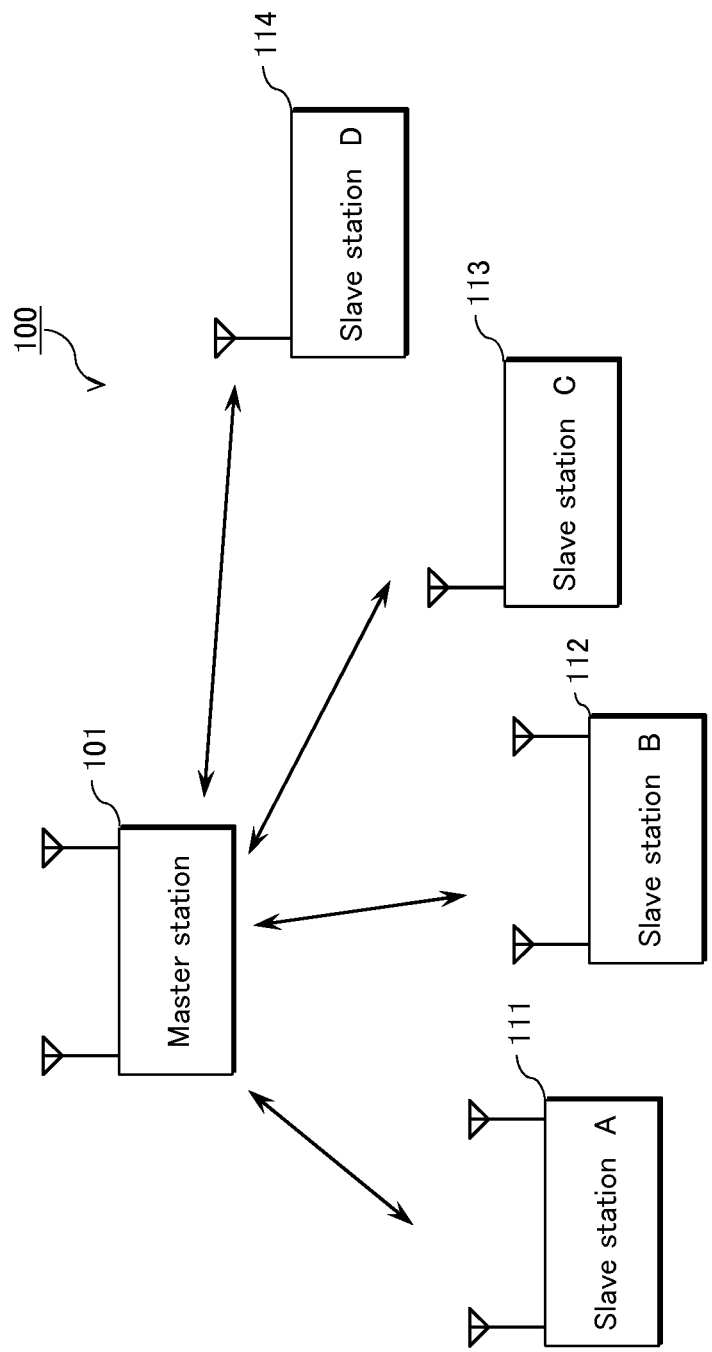
FIG. 1 illustrates an example system pertaining to embodiment 1.

Findings Underlying the Present Invention (1) A wireless communication device pertaining to an embodiment of the present invention is a wireless communication device comprising: a first antenna and a second antenna for wireless communication with another communication device; a transmitter configured to transmit a request signal to the other communication device via one antenna out of the first antenna and the second antenna; a receiver configured to receive a response signal transmitted from the other communication device, the response signal being transmitted in response to the other communication device receiving the request signal; an antenna controller configured to switch between the first antenna and the second antenna upon the transmitter transmitting the request signal; and a transmission controller configured to increase or decrease a transmission power for the transmitter to transmit the request signal when the antenna controller switches between the first antenna and the second antenna.

According to the present aspect, each time switching between the first antenna and the second antenna is performed, a transmission power for transmitting the request signal is increased or decreased. Thus, among a plurality of antennas, an antenna that can transmit data at a lowest transmission power is specified when transmitting data to another communication device.

(2) Referring to (1), the transmission controller may increase the transmission power for transmitting the request signal when the antenna controller switches between the first antenna and the second antenna.

Referring to a transmission diversity scheme that switches between antennas to transmit data, when transmission to another communication device is performed not with all the antennas but with one antenna among the antennas, power consumption increases as transmission power of the one antenna increases, and therefore specifying an antenna that can transmit to the other communication device at a lowest transmission power is necessary.

Further, the longer a search time for specifying the transmission power and the one antenna to use to transmit to the other communication device, the greater the band occupancy rate, and as a result power consumption and communication traffic increases.

Thus, it is desirable to reduce the search time for specifying the antenna that can communicate with the other communication device and the transmission power required when using the antenna.

(3) Referring to (2), the transmission controller, when the receiver receives the response signal as a result of transmission of a request signal at a first transmission power via the one antenna, may set a second transmission power that is less than the first transmission power and greater than a transmission power previously used for transmitting a request signal via the one antenna, and the transmitter may transmit a request signal at the second transmission power via the one antenna.

According to the present aspect, a time required to specify an antenna to use when transmitting data to the other communication device is shorter than a time required by conventional technology, and the transmission power of the antenna can be set as small as possible. Thus, an increase in band occupancy rate is suppressed, and as a result power consumption and communication traffic is suppressed.

(4) Referring to (3), the receiver may detect a signal strength of the response signal upon reception, and the transmission controller may set the second transmission power lower for greater values of the signal strength.

(5) Referring to (3) or (4), the antenna controller, after the receiver receives the response signal via the one antenna, may set the transmitter to transmit the request signal via the one antenna without switching to the other one of the first antenna and the second antenna.

(6) Referring to (3), the transmission controller, when the receiver receives the response signal via the one antenna, may set as the second transmission power a most recently set transmission power used when another antenna out of the first antenna and the second antenna did not receive the response signal.

(7) Referring to any of (3) to (6), when the receiver is unable to receive the response signal as a result of the transmitter transmitting the request at the second transmission power via the one antenna, the transmission controller may set a transmission power to use to communicate with the other communication device to the first transmission power, and when the receiver is able to receive the response signal as a result of the transmitter transmitting the request at the second transmission power via the one antenna, the transmission controller may set the transmission power to use to communicate with the other communication device to the second transmission power.

(8) Referring to (1), the transmission controller, while the receiver is able to receive the response signal via the first antenna and via the second antenna, may decrease the transmission power for transmitting the request signal when the antenna controller switches between the first antenna and the second antenna.

(9) Referring to (8), the transmission controller, when the receiver is unable to receive the response signal when the first antenna is used and when the second antenna is used, may set a transmission power to use to communicate with the other communication device to a transmission power last set when the receiver was able to receive the response signal.

(10) Referring to (9), when the receiver is unable to receive the response signal as a result of the transmitter transmitting the request signal via the one antenna at a given transmitter power, the transmitter may transmit the request signal via another antenna out of the first antenna and the second antenna at a transmitter power identical to the given transmitter power and, until the receiver is unable to receive the response signal, transmit the request signal via the other antenna without switching to the one antenna, decreasing a transmission power used to transmit the request signal when the request signal is transmitted.

(11) Referring to any of (1) to (10), an initial value of the transmission power may be a power set when installing the wireless communication device.

(12) Referring to any of (2) to (7), an initial value of the transmission power may be a minimum power the wireless communication device is able to output.

(13) Referring to any of (8) to (10), an initial value of the transmission power may be a maximum power the wireless communication device is able to output.

(14) Referring to (1), an initial value of the transmission power may be an intermediate value of a range of transmission power the wireless communication device is able to output.

(15) Referring to (1), the transmission controller, when the receiver receives the response signal as a result of transmission of the request signal at a transmission power of the initial value, may decrease the transmission power when the antenna controller switches between the first antenna and the second antenna, and, when the receiver does not receive the response signal as a result of the transmission of the request signal at the transmission power of the initial value, increase the transmission power when the antenna controller switches between the first antenna and the second antenna.

(16) A transmission power control method of a wireless communication device provided with a first antenna and a second antenna for wireless communication with another communication device, the transmission power control method comprising: transmitting a request signal to the other communication device via one antenna of the first antenna and the second antenna; receiving a response signal transmitted from the other communication device, the response signal being transmitted in response to the other communication device receiving the request signal; switching between the first antenna and the second antenna upon transmission of the request signal; and increasing or decreasing a transmission power for the transmission of the request signal each time the switching between the first antenna and the second antenna is performed.

(17) An integrated circuit comprising: a first antenna and a second antenna for wireless communication with another communication device; a transmitter configured to transmit a request signal to the other communication device via one antenna of the first antenna and the second antenna; a receiver configured to receive a response signal transmitted from the other communication device, the response signal being transmitted in response to the other communication device receiving the request signal; an antenna controller configured to switch between the first antenna and the second antenna upon the transmitter transmitting the request signal; and a transmission controller configured to increase or decrease a transmission power for the transmitter to transmit the request signal each time the antenna controller switches between the first antenna and the second antenna.

(18) A non-transitory, computer-readable storage medium containing a program executable by a computer to execute transmission power control processing of a wireless transmission device provided with a first antenna and a second antenna for wireless communication with another communication device, the program comprising: transmitting a request signal to the other communication device via one antenna of the first antenna and the second antenna; receiving a response signal transmitted from the other communication device, the response signal being transmitted in response to the other communication device receiving the request signal; switching between the first antenna and the second antenna upon transmission of the request signal; and increasing or decreasing a transmission power for the transmission of the request signal each time the switching between the first antenna and the second antenna is performed.

The following describes embodiments of the present invention, with reference to the drawings.

Each embodiment described below illustrates a specific example of the present invention. The numbers, shapes, materials, elements, element locations and connections, steps, order of steps, etc., of the embodiments below are examples, and are not intended to limit the present invention. Further, among the elements pertaining to the embodiments below, elements not described in independent claims that indicate the most significant concept are described as optional elements.

Embodiment 1

Embodiment 1 describes a method of appropriately setting transmission power when a communication device having two communication antennas is used to perform wireless communication transmitting to a plurality of slave stations, which are other communication devices. The method of setting transmission power of a communication device according to the present embodiment can be applied to various wireless communication standards. For example, the method may be applied to IEEE 802.15.4, but is not limited to IEEE 802.15.4.

FIG. 1 illustrates an example system pertaining to embodiment 1.

The system illustrated in FIG. 1 includes a master station 101, a slave station A111, a slave station B112, a slave station C113, and a slave station D114.

The master station 101 has at least two antennas, and wirelessly communicates with the slave station A111, the slave station B112, the slave station C113, and the slave station D114, by switching between antennas.

The slave station A111, the slave station B112, the slave station C113, and the slave station D114 may have only one antenna each, and may have a plurality of antennas each.

Figure 2:
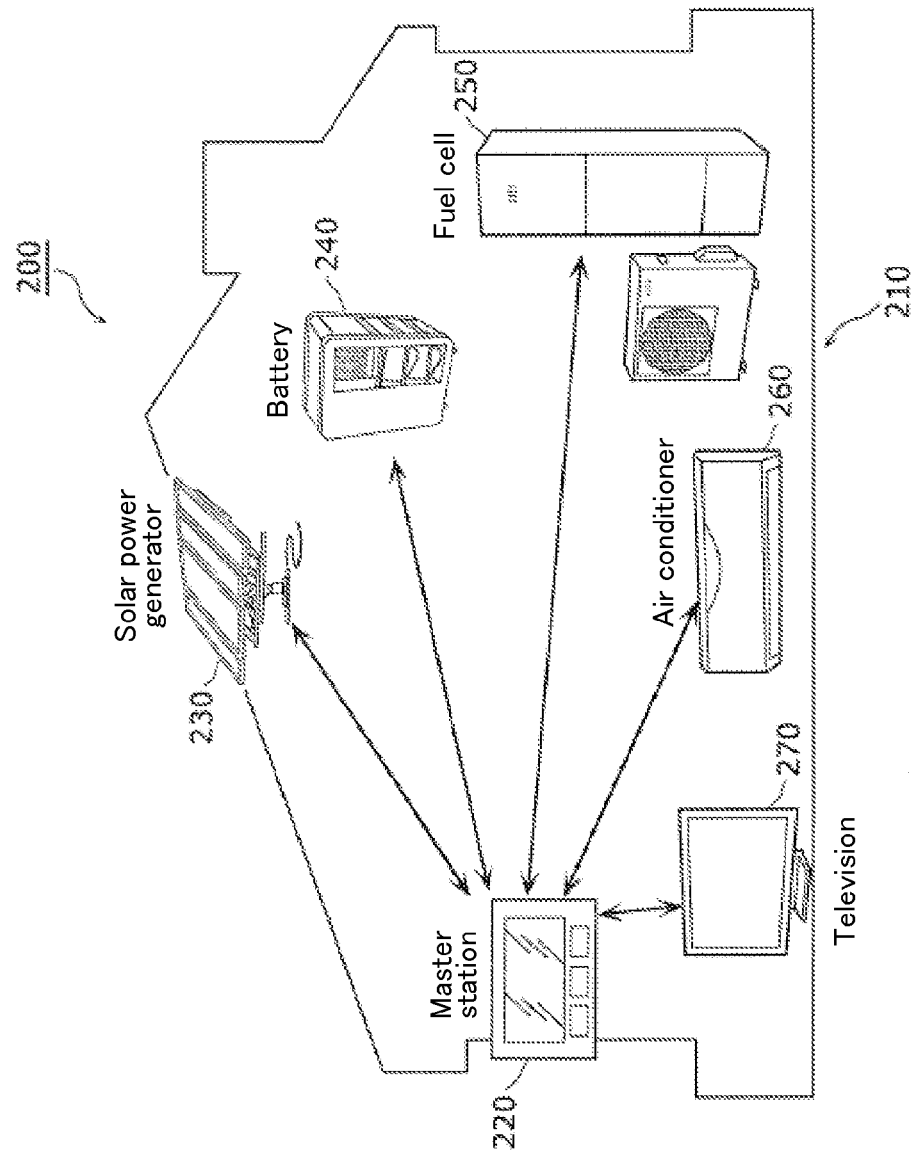
FIG. 2 illustrates specific application examples of a system pertaining to embodiment 1.

FIG. 2 illustrates an application example of a system pertaining to embodiment 1.

According to a system 200 illustrated in FIG. 2, a master station 220 is connected, via a home network 210 set up in a typical home, to a solar power generator 230, a battery 240, a fuel cell 250, an air conditioner 260, and a television 270. The solar power generator 230, the battery 240, the fuel cell 250, the air conditioner 260, and the television 20 are examples of slave stations having wireless communication functions.

Figure 3:
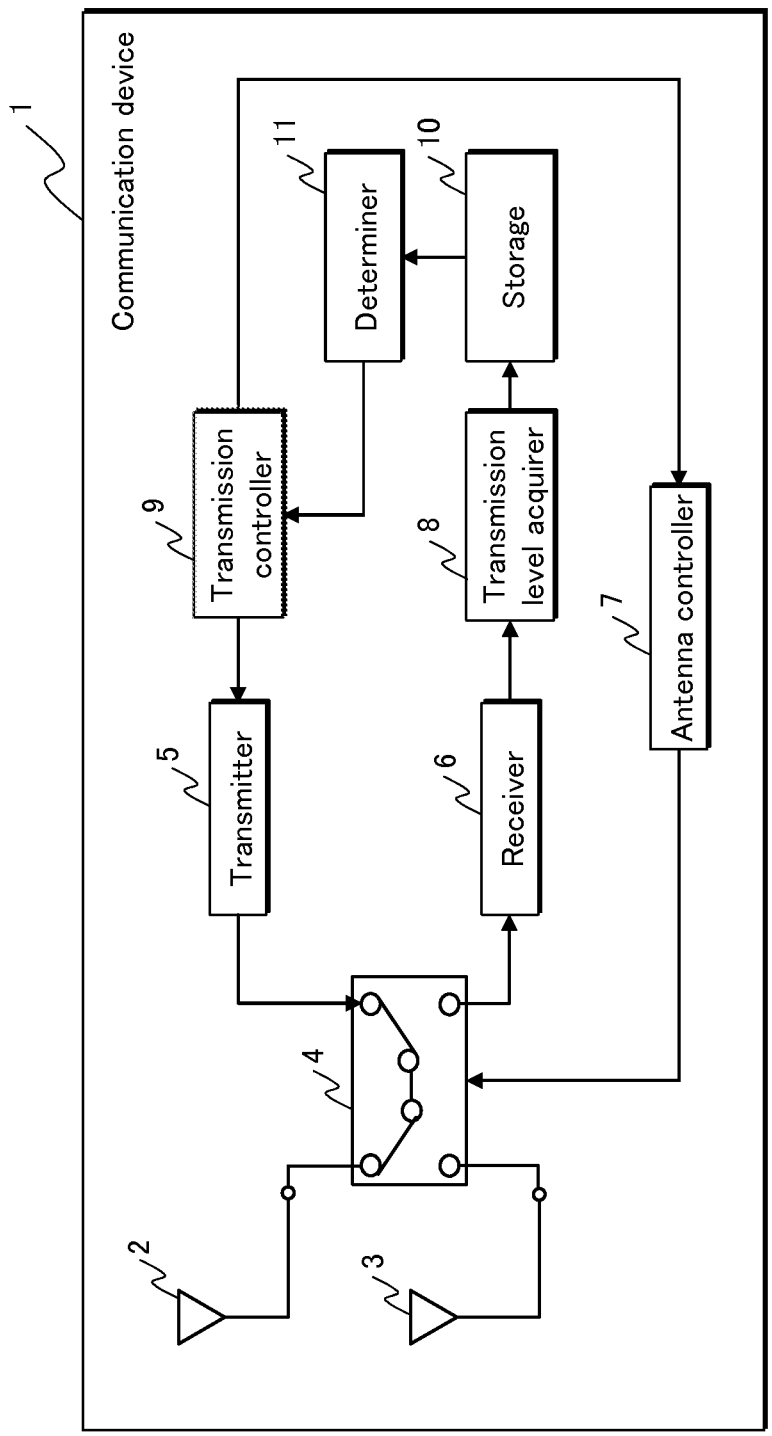
FIG. 3 illustrates an example of function blocks of a communication device pertaining to embodiment 1.

FIG. 3 illustrates an example of function blocks of a communication device pertaining to embodiment 1. Here, a case in which the communication device is the master station illustrated in either FIG. 1 or FIG. 2 is described as an example.

As illustrated in FIG. 3, a communication device 1 pertaining to embodiment 1 includes a first antenna 2, a second antenna 3, a switcher 4, a transmitter 5, a receiver 6, an antenna controller 7, a communication level acquirer 8, a transmission controller 9, a storage 10, and a determiner 11.

The first antenna 2 and the second antenna 3 each transmit and receive electromagnetic waves pertaining to wireless communication.

The switcher 4 switches the antenna used in transmission and reception of data. In other words, the switcher 4 is a switch that can switch between the first antenna 2 and the second antenna 3 in data transmission by the transmitter 5 and data reception by the receiver 6. Switching control is performed by the antenna controller 7.

The switcher 4, according to embodiment 1, is a configuration that does not allow simultaneous transmission and reception by the transmitter 5 and the receiver 6, but the switcher 4 is not limited in this way. For example, assuming a configuration that can switch one of the first antenna 2 and the second antenna 3 to become a transmit antenna and the other one of the first antenna 2 and the second antenna 3 to become a receive antenna, transmission by the transmitter 5 and reception by the receiver 6 may be performed simultaneously.

The transmitter 5 transmits data to each slave station by using one of the first antenna 2 and the second antenna 3. In other words, the transmitter 5 transmits data to the solar power generator 230, the battery 240, the fuel cell 250, the air conditioner 260, and the television 270, which are illustrated in FIG. 2. The data is, for example, data used for connecting a slave station to a wireless network 210.

The receiver 6 receives data from each slave station 230, 240, 250, 260, 270 by using one of the first antenna 2 and the second antenna 3.

For example, the receiver 6 receives an acknowledgment (ACK), which is response information transmitted from a slave station that received data unicast from the transmitter 5, by using one of the first antenna 2 and the second antenna 3.

Of course, aside from an ACK, the receiver 6 also receives, for example, data indicating a power consumption amount that is transmitted from a slave station as a response to data transmitted by the transmitter 5 that requests a power consumption amount. In other words, the receiver 6 receives data from another communication device by using one of a plurality of antennas.

The antenna controller 7 switches the first antenna 2 and the second antenna 3 by controlling the switcher 4 according to a request signal transmitted from the transmitter 5 or a response signal received by the receiver 6.

The communication level acquirer 8 acquires a reception level from each of the first antenna 2 and the second antenna 3, when the receiver 6 has received ACKs from each of the slave stations 230, 240, 250, 260, 270. A value indicating the reception level is, for example, a received signal strength indication (RSSI).

The transmission controller 9 controls transmission power of an antenna used when the transmitter 5 transmits data. The transmission controller 9 increases or decreases transmission power each time the antenna is switched.

Whether or not transmission power is increased or decreased is determined by the determiner 11, based on information from an antenna table stored by the storage 10. For example, in a case in which the determiner 11 compares RSSIs acquired by the communication level acquirer 8 of ACKs received from each of the slave stations 230, 240, 250, 260, 270 and an arbitrary power threshold stored in advance by the storage 10, and an RSSI is lower than the threshold, the determiner 11 determines that the slave station corresponding to the RSSI is far, and causes the transmission power to be increased. On the other hand, in a case in which an RSSI is higher than the threshold, the determiner 11 determines that the slave station corresponding to the RSSI is near, and causes the transmission power to be decreased.

The determiner 11 compares the arbitrary power threshold stored in advance by the storage 10 and an RSSI acquired by the communication level acquirer 8, determines an initial value when transmission power is increased or decreased, and determines whether or not transmission power is increased or decreased.

Figure 4:
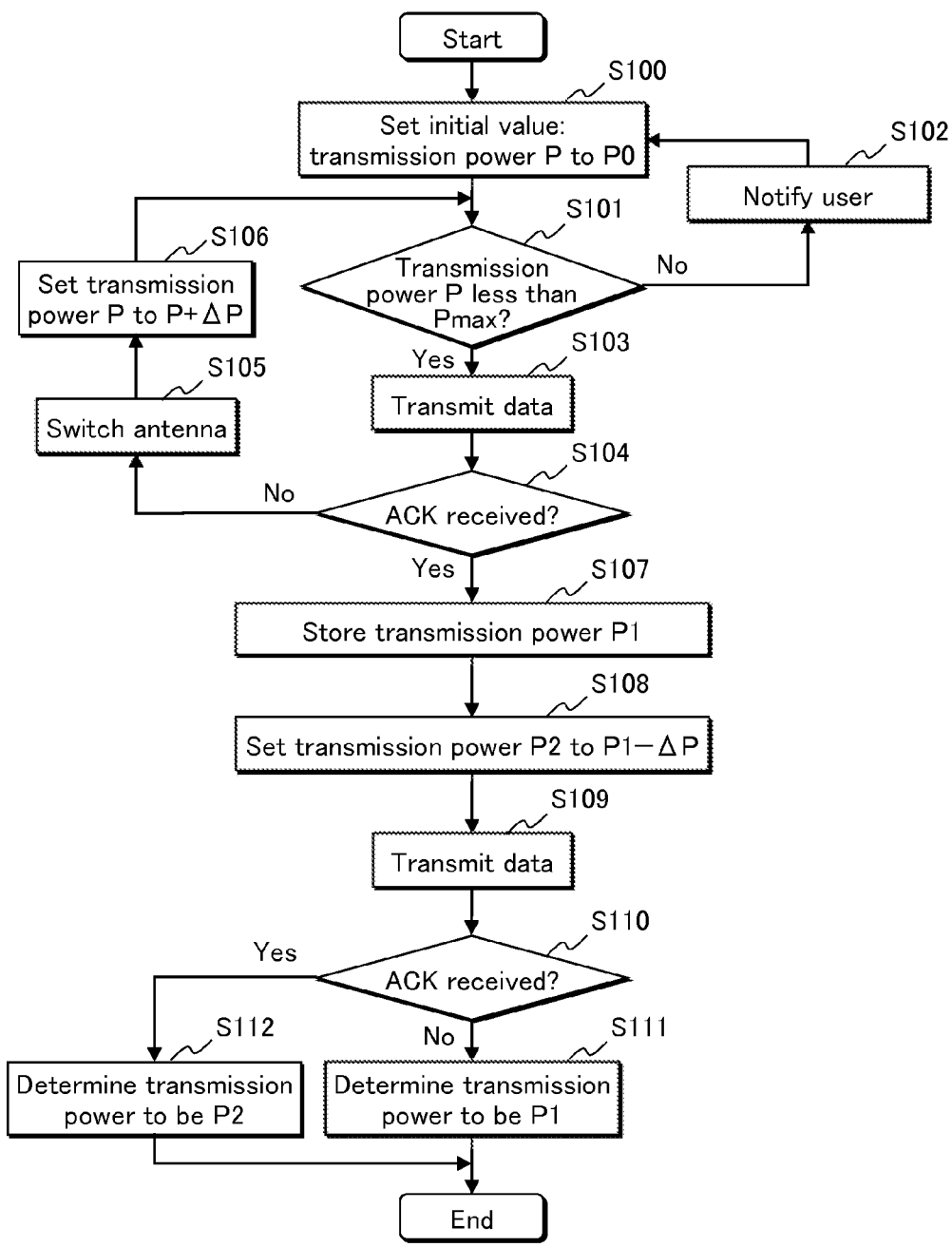
FIG. 4 is a flowchart illustrating an example of transmission power control processing of a communication device pertaining to embodiment 1.

FIG. 4 is a flowchart illustrating an example of transmission power control processing of the communication device 1 pertaining to embodiment 1. In the following, the communication device 1 is described as either the master station 101 illustrated in FIG. 1 or the master station 220 illustrated in FIG. 2.

First, the determiner 11 of the communication device 1 sets a transmission power P to an initial value P0 (S100).

Subsequently, the determiner 11 compares the transmission power P and a maximum value of transmission power Pmax (S101). In S101, when the determiner 11 determines that the transmission power P is at least Pmax (No at S101), the communication device 1 notifies the user (S102) and the determiner 11 updates the initial value P0. Pmax is either a maximum transmission power that can be outputted by a wireless integrated circuit (IC) mounted on the communication device 1 or a transmission power as regulated by law.

After notifying the user (S102), the processing may be ended.

On the other hand, in S101, when the determiner 11 determines that the transmission power P is less than Pmax (Yes at S101), the transmitter 5 transmits data to a slave station at the transmission power P, by using one of the first antenna 2 and the second antenna 3 (S103).

After data transmission (S103), the receiver 6 determines whether or not an ACK is received from the slave station (S104). When reception of an ACK is not confirmed (No at S104), the antenna controller 7 switches the antenna that is used to another antenna (S105).

After switching of the antenna (S105), the transmission controller 9 adds an arbitrary power amount ΔP to the transmission power amount at which the data was transmitted (S106), and processing returns to S101.

On the other hand, when reception of an ACK is confirmed (Yes at S104), the communication device 1 causes the storage 10 to store the transmission power P1 used (S107).

Subsequently, the transmission controller 9 sets a transmission power P2, which is equal to the transmission power P1 minus the arbitrary power amount ΔP (S108).

Subsequently, the transmitter 5 transmits data to the slave station at the transmission power P2, by using the antenna (S109).

Subsequently, the receiver 6 determines whether or not an ACK is received from the slave station (S110). When reception of an ACK is not confirmed (No at S110), the determiner 11 determines that transmission of data to the slave station is to be performed at the transmission power P1 stored in S107, by using the antenna (S111), and processing ends. On the other hand, when reception of an ACK is confirmed (Yes at S110), the determiner 11 determines that transmission of data to the slave station is to be performed at the transmission power P2, by using the antenna (S112), and processing ends.

Figure 5:
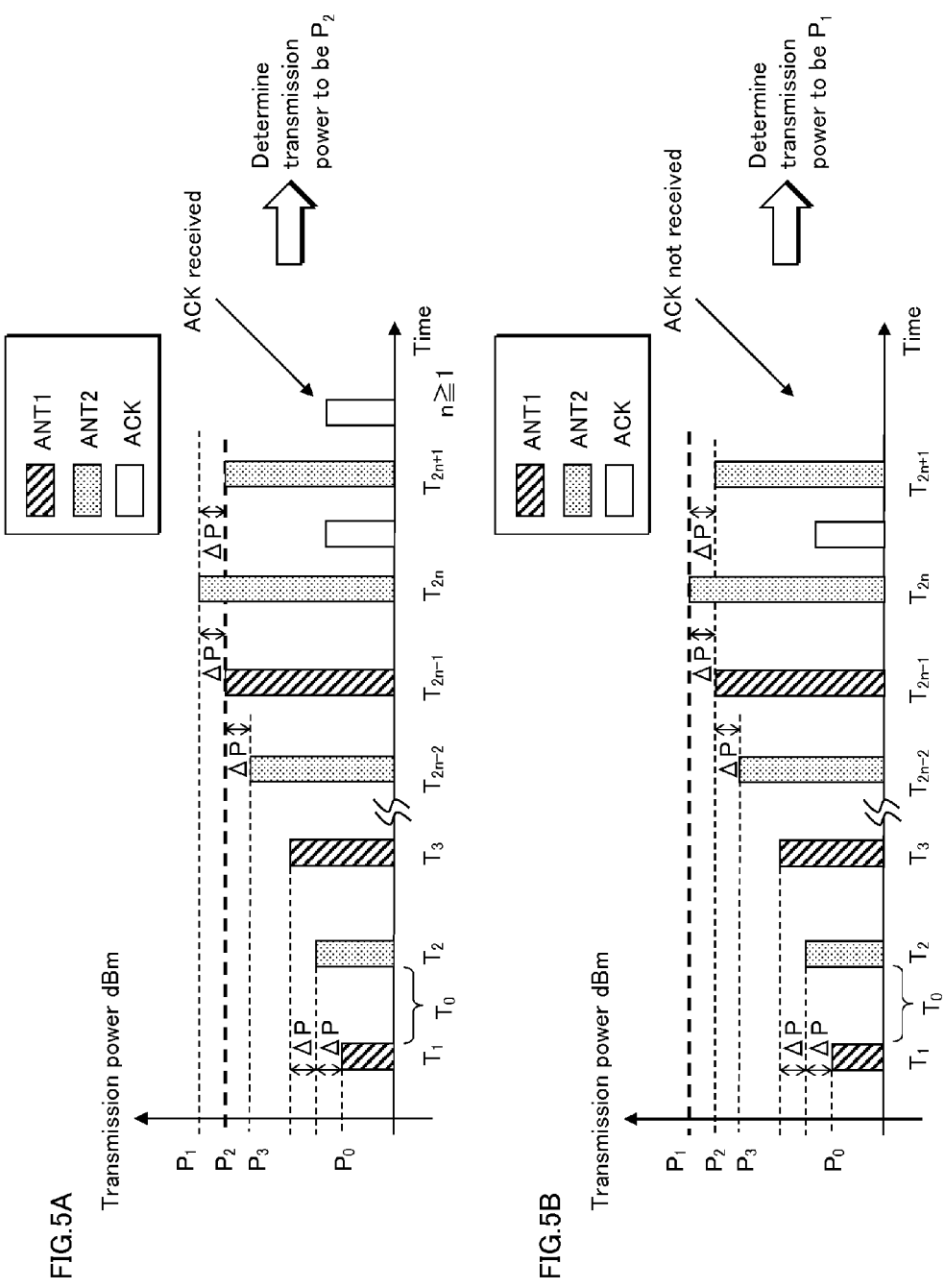
FIG. 5A and FIG. 5B are schematic diagrams illustrating transmission power control processing of a communication device pertaining to embodiment 1.

FIG. 5A and FIG. 5B are schematic diagrams illustrating transmission power control processing of the communication device 1 described by FIG. 4.

In FIG. 5A and FIG. 5B, ANT1 indicates the first antenna 2 and ANT2 indicated the second antenna 3. The horizontal axis of the graph indicates time and the vertical axis of the graph indicates transmission power.

In FIG. 5A and FIG. 5B, the communication device 1 transmits, for example, data to the slave station at a transmission power P0 (the initial value), by using the first antenna at time T1.

After data transmission, the communication device 1 waits for reception of an ACK from the slave station for an arbitrary unit of time T0. When the communication device 1 does not receive an ACK, the communication device 1 switches the antenna to the second antenna at time T2, adds the arbitrary power amount ΔP to the transmission power, and re-transmits the data.

The communication device 1 repeats this processing until an ACK is received by using one of the first antenna and the second antenna (FIG. 4, S101 to S106).

Thus, the communication device 1, for example, transmits data at the transmission power P1, by using the second antenna at time T2$n$, and receives an ACK. At this time, it is confirmed that the first antenna has not received an ACK at the transmission power P2 (P1−ΔP) at time T2$n$−1, but whether or not the second antenna receives an ACK at the transmission power P2 has not been checked, and therefore the communication device 1 transmits data at the transmission power P2, by using the second antenna at time T2$n$+1. In other words, after time T2$n$, the communication device 1 transmits data by again using the second antenna at time T2$n$+1, without switching from the second antenna to the first antenna.

Subsequently, the communication device 1 determines that the transmission power when transmitting data to the slave station is the transmission power P2 in a case in which an ACK is received from the slave station, as illustrated in FIG. 5A, and determines that the transmission power when transmitting data to the slave station is the transmission power P1 in a case in which an ACK is not received from the slave station, as illustrated in FIG. 5B.

According to the present embodiment, the transmission power of the second antenna is determined to be the transmission power P2 at time T2$n$+1 (the most recent transmission power when data was transmitted by using the first antenna), but the present embodiment is not limited in this way. At time T2$n$+1, it suffices that the transmission power used by the second antenna is greater than a transmission power P3, i.e. the transmission power used by the second antenna at time T2$n$−2, and less than the transmission power P1.

Modification 1 of Embodiment 1

Figure 6:
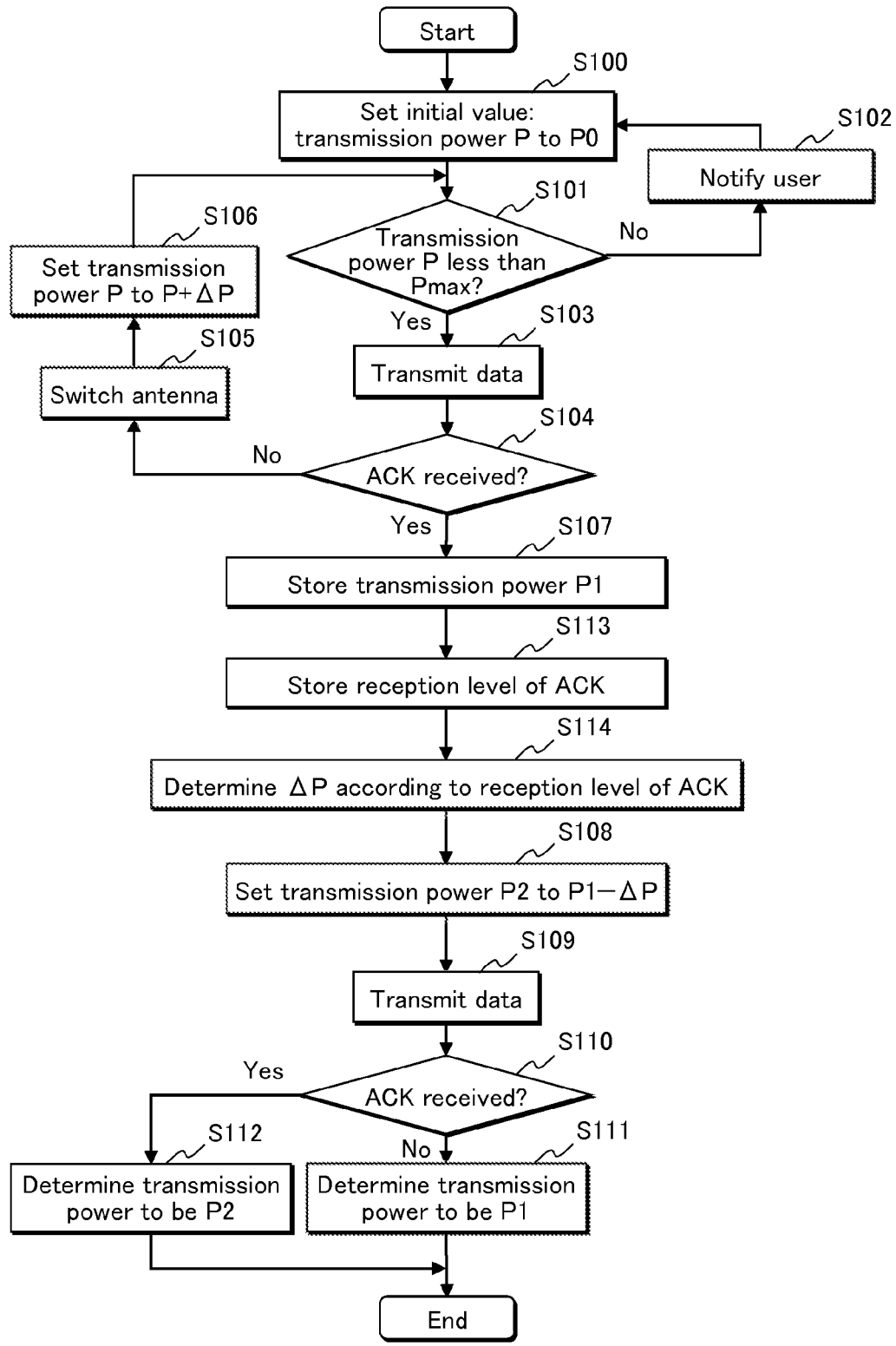
FIG. 6 is a flowchart illustrating transmission power control processing of a communication device pertaining to a modification of embodiment 1.

The following describes modification 1 of embodiment 1 of the present invention, with reference to FIG. 6.

FIG. 6 is a flowchart illustrating transmission power control processing of the communication device 1 pertaining to modification 1 of embodiment 1. Portions of FIG. 6 that differ from FIG. 4 are described, and description of steps in which identical processing is performed is omitted.

In FIG. 6, processing that differs from that of FIG. 4 is that a reception level of an ACK from the slave station is acquired by the communication level acquirer 8 and stored by the storage 10 (S113) and the determiner 11 adjusts a magnitude of the power amount ΔP according to the reception level of the ACK (S114). According to embodiment 1, after receiving an ACK at the transmission power P1 by using the second antenna at time T2$n$ illustrated in FIG. 5A and FIG. 5B, and when transmitting data by using the second antenna at time T2$n$+1, the communication device 1 transmits data at the transmission power P2 of the latest time at which data was transmitted by using the first antenna (time T2$n$−1). In contrast, according to the present modification, when transmitting data by using the second antenna at time T2$n$+1, the communication device 1 does not fix transmission power to the transmission power P2 at which data was transmitted by using the first antenna at time T2$n$−1, and instead changes the transmission power according to the reception level of the ACK received at time T2$n$.

In S114, for example, when the reception level of the ACK is large, the power amount ΔP between the transmission power P1 and the transmission power P2 is adjusted to be small, and when the reception level of the ACK is small, the power amount ΔP is adjusted to be large. In other words, the power amount ΔP by which the transmission power is decreased is adjusted according to the reception level of the ACK, and therefore the transmission power can be set to as small a value as possible.

Modification 2 of Embodiment 1

Figure 7:
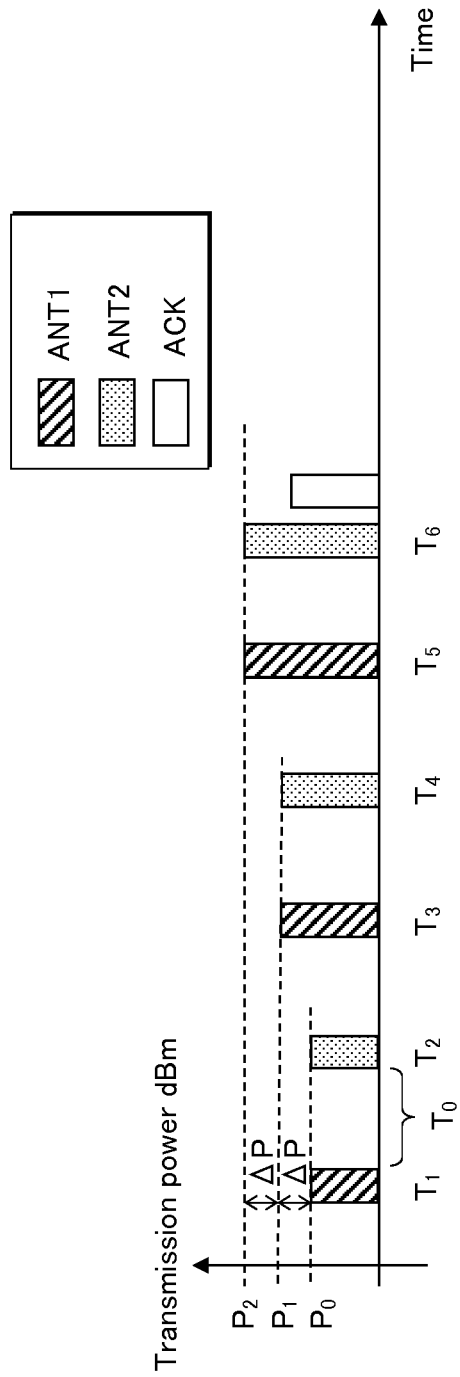
FIG. 7 is a schematic diagram for describing a modification of embodiment 1.

The following describes modification 2 of embodiment 1 of the present invention, with reference to FIG. 7.

FIG. 7 is a schematic diagram illustrating transmission power control of the communication device 1 pertaining to modification 2 of embodiment 1. In FIG. 7, ANT1 indicates the first antenna 2 and ANT2 indicated the second antenna 3. The horizontal axis of the graph indicates time and the vertical axis of the graph indicates transmission power.

According to the present modification, in FIG. 7, alternately switching between the first antenna and the second antenna is the same as in FIG. 4, FIG. 5A, and FIG. 5B, but in a case that an ACK is not received after transmitting data by using the first antenna at time T1, the communication device 1 transmits data at time T2 by using the second antenna at a transmission power identical to the transmission power P1 used at time T1. Subsequently, when an ACK is not received from the slave station after transmitting data at the transmission power P0 by using the second antenna, the communication device 1 switches to the first antenna and transmits data by increasing the transmission power to the transmission power P1 (P0+ΔP) at time T3. This processing is repeated until an ACK is received from the slave station.

In FIG. 7, the communication device 1 receives an ACK from the slave station when transmitting data at the transmission power P2 by using the second antenna at time T6, and therefore wireless communication with the slave station is performed by using the second antenna at the transmission power P2.

Effects

Figure 8:
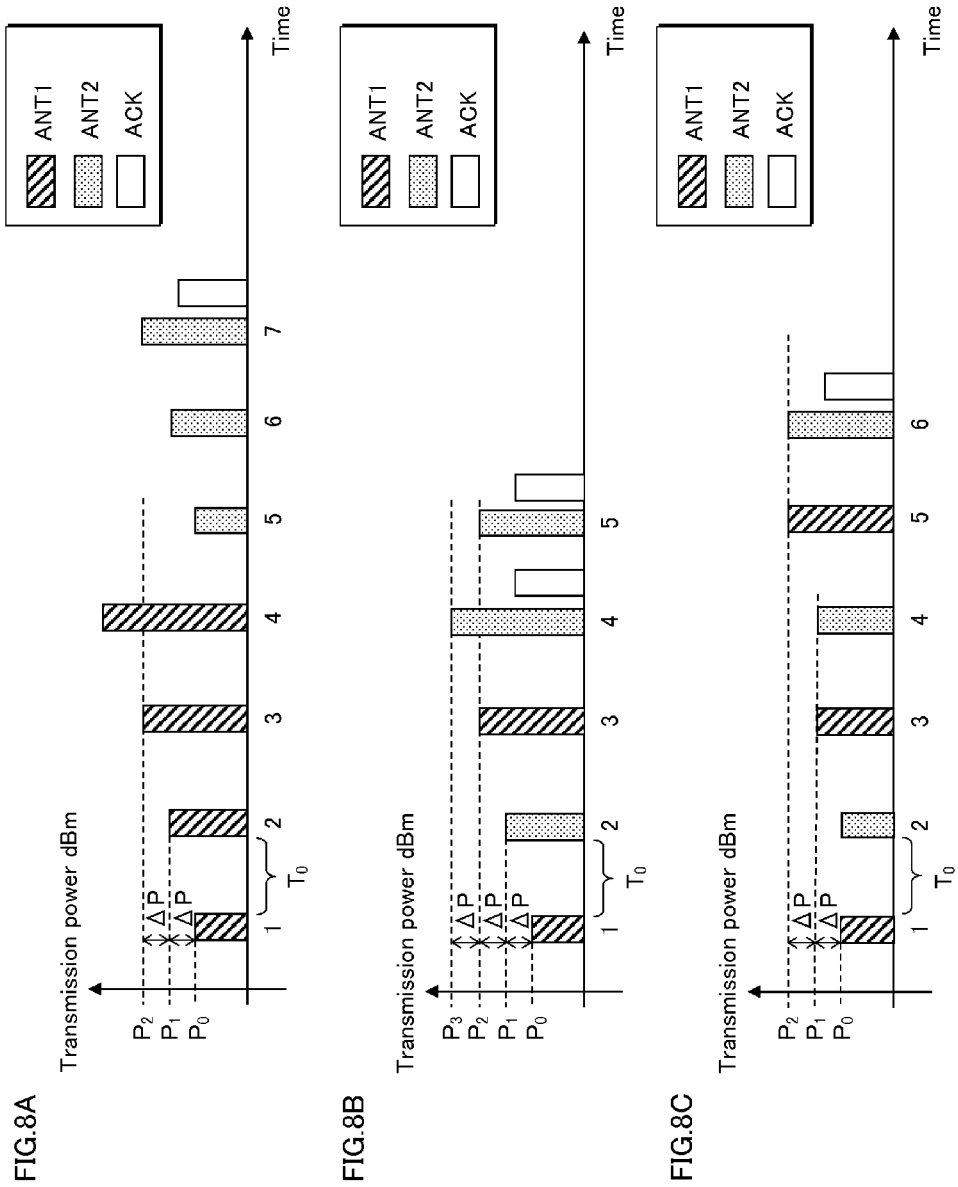
FIGS. 8A, 8B, and 8C are schematic diagrams for describing effects of the invention pertaining to embodiment 1.

FIGS. 8A, 8B, and 8C are schematic diagrams for describing effects of the communication device of embodiment 1. FIG. 8A is a diagram for comparison of the transmission power control of embodiment 1 to conventional technology. FIG. 8B illustrates an example of power transmission control according to embodiment 1, and FIG. 8C illustrates an example of power transmission control according to modification 2 of embodiment 1. It is assumed that due to the influence of factors such as fading, performance of the first antenna is lower than performance of the second antenna, and that communication is possible at the transmission power P2 by using the second antenna. Here, a mechanism is described by which the influence of factors such as fading can generate a performance difference between the first antenna and the second antenna.

Figure 9:
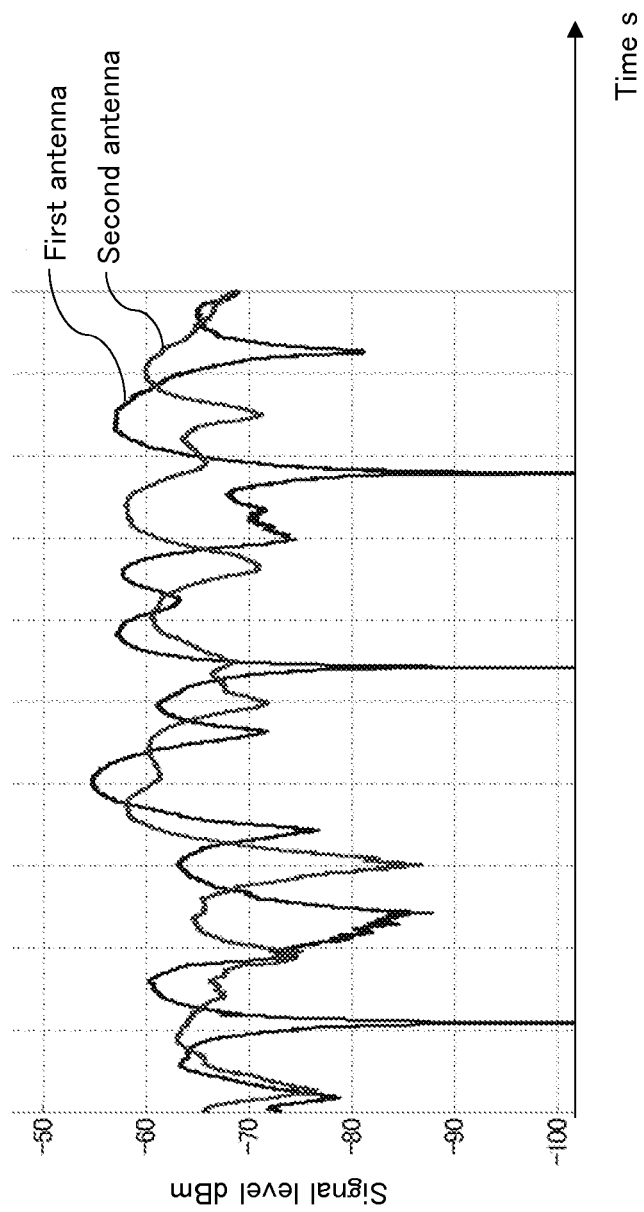
FIG. 9 is a diagram illustrating an example of fluctuations of signal levels monitored by a first antenna and a second antenna.

FIG. 9 is a diagram illustrating an example of fluctuations in reception level observed for the first antenna 2 and the second antenna 3. The example illustrated in FIG. 9 is of results indicating reception power when the communication device 1 is moved in an arbitrary direction. The horizontal axis indicates time. From these results it can be seen that reception power of each antenna is not always constant, and when the surrounding environment changes, such as radio wave interference, the reception power also fluctuates by at least 10 dB over time. In the same way, when transmitting data at identical transmission powers, the reception power at the slave station can differ between the first antenna and the second antenna.

Returning to FIGS. 8A, 8B, and 8C, for example, when transmitting by using the first antenna and reception power of the slave station is low, the situation in which reception power is low may continue unless the surrounding environment changes.

In this case, as illustrated in FIG. 8A, when performing processing to detect an ACK while increasing transmission power using only the first antenna, a period in which an ACK is not received may continue for a long time. Subsequently, even when switching to the second antenna an receiving an ACK by increasing transmission power, determining the antenna and the transmission power takes time.

On the other hand, as illustrated in FIG. 8B and FIG. 8C, by switching antennas and transmitting data by using each antenna, even when reception power of one of the antennas is low, an antenna that can communicate with the slave station and a preferred transmission power can be determined faster than when using conventional technology.

In FIG. 8B, data is transmitted to the slave station at the transmission power P3 by using the second antenna at time T4, and an ACK is received in response, and therefore data has not yet been transmitted using the second antenna at the transmission power P2, which was the transmission power used to transmit data using the first antenna at time T3, prior to time T4. Thus, at time T5, data is transmitted at the transmission power P2 by using the second antenna. Subsequently, an ACK is received in response to the data transmitted at time T5, and therefore a combination of antenna and transmission power is determined to be the second antenna and the transmission power P2.

In FIG. 8C, an ACK is received when using the second antenna at the transmission power P2 at time T6, but an ACK is not received when using the first antenna at the transmission power P2 at time T5 or when using the second antenna at the transmission power P1 at time T4. Thus, a combination of antenna and transmission is determined to be the second antenna and the transmission power P2.

As a result, the antenna and transmission power is determined at time T5 in FIG. 8B and at time T6 in FIG. 8C. In other words, in this case, the antenna and the transmission power required is determined earlier according to FIG. 8B.

The above describes the communication device 1 and the communication method thereof (method of determining antenna and method of determining transmission power), pertaining to embodiment 1. According to embodiment 1, the communication device 1 is described as having two antennas, but the communication device 1 may have three or more antennas.

The communication device 1 pertaining to embodiment 1 is not limited to being applied to the master station 101 that has a plurality of antennas illustrated in FIG. 1, and may be applied to the slave station A111 and the slave station B112 that each have a plurality of antennas.

Embodiment 2

The communication device 1 pertaining to embodiment 1 increases transmission power from an initial value each time it switches between antennas, as described in FIG. 4. According to embodiment 2, the communication device 1 decreases transmission power from an initial value each time it switches between antennas.

Figure 10:
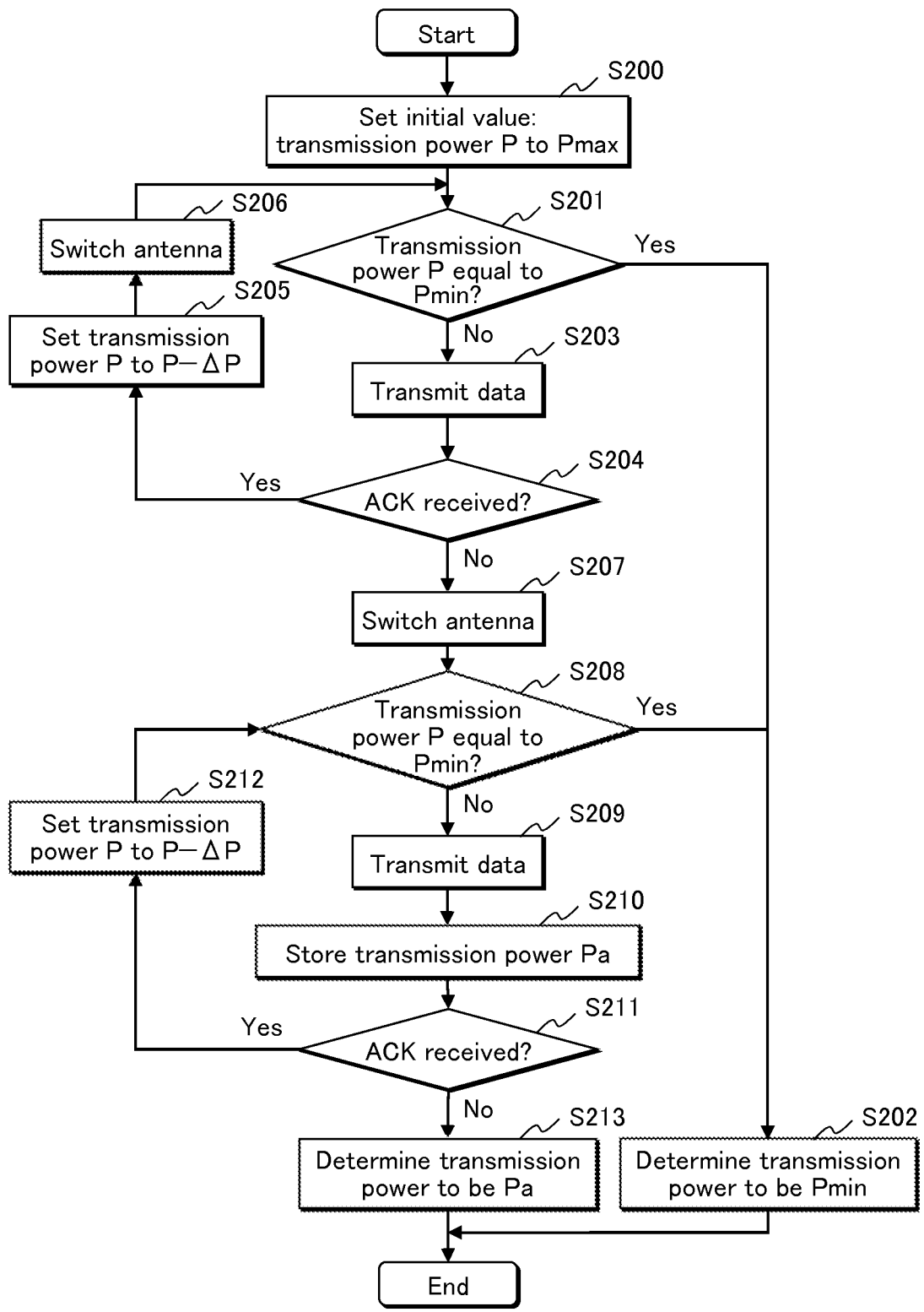
FIG. 10 is a flowchart illustrating an example of transmission power control processing of a communication device pertaining to embodiment 2.

The following describes embodiment 2 with reference to FIG. 10, FIG. 11A, and FIG. 11B.

FIG. 10 is a flowchart illustrating transmission power control processing of the communication device 1 pertaining to embodiment 2.

First, the determiner 11 of the communication device 1 sets the transmission power P to a maximum power Pmax as the initial value (S200). Pmax is defined as in embodiment 1, being a maximum transmission power that can be outputted by a wireless IC mounted on the communication device 1 or a transmission power as regulated by law.

Subsequently, the determiner 11 determines whether or not the transmission power P is a minimum value of transmission power Pmin (S201). In S201, when P is equal to Pmin (Yes at S201), the determiner 11 determines that data is transmitted to the slave station so that the transmission power P equals Pmin, by using one of the first antenna 2 and the second antenna 3 (S202). When P does not equal Pmin (No at S201), the transmitter 5 transmits data to the slave station by using one of the first antenna 2 and the second antenna 3 (S203). Pmin is defined as a minimum transmission power that can be outputted by a wireless IC mounted on the communication device 1 or a minimum transmission power as regulated by law.

Subsequently, after transmission of data (S203), the receiver 6 determines whether or not an ACK is received from the slave station (S204). When reception of an ACK is confirmed (Yes at S204), the transmission controller 9 subtracts the power amount ΔP from the transmission power P at which the data was transmitted (S205), and the antenna controller 7 switches the antenna that is used to another antenna (S206).

Subsequently, the communication device 1 repeats processing from S201 to S206 until reception of an ACK is not confirmed at S204.

When reception of an ACK is not confirmed at step S204 (No at S204), the antenna controller 7 switches the antenna that is used to another antenna (S207).

After S207, the determiner 11 determines whether or not a transmission power Pa, i.e. the transmission power when reception of an ACK is not confirmed (No at S204), is equal to the minimum transmission power Pmin (S208). When the determiner 11 determines that the transmission power Pa is equal to Pmin (Yes at S208), the determiner 11 determines that data is to be transmitted to the slave station at the transmission power Pmin by using the antenna (S202), and processing ends. When the determiner 11 determines that the transmission power Pa is not equal to Pmin (No at S208), the transmitter 5 transmits data at the transmission power Pa by using the antenna (S209) and the storage 10 stores the transmission power Pa at this time (S210).

After S210, the receiver 6 determines whether or not an ACK is received from the slave station (S211). When reception of an ACK is confirmed (Yes at S211), the transmission controller 9 subtracts the power amount ΔP from the transmission power Pa (S212) and processing returns to S208. When reception of an ACK is not confirmed (No at S211), the determiner 11 determines that data is to be transmitted to the slave station at the transmission power Pa by using the antenna (S213), and processing ends.

FIG. 11A and FIG. 11B are schematic diagrams illustrating transmission power control processing described by FIG. 10.

Figure 11:
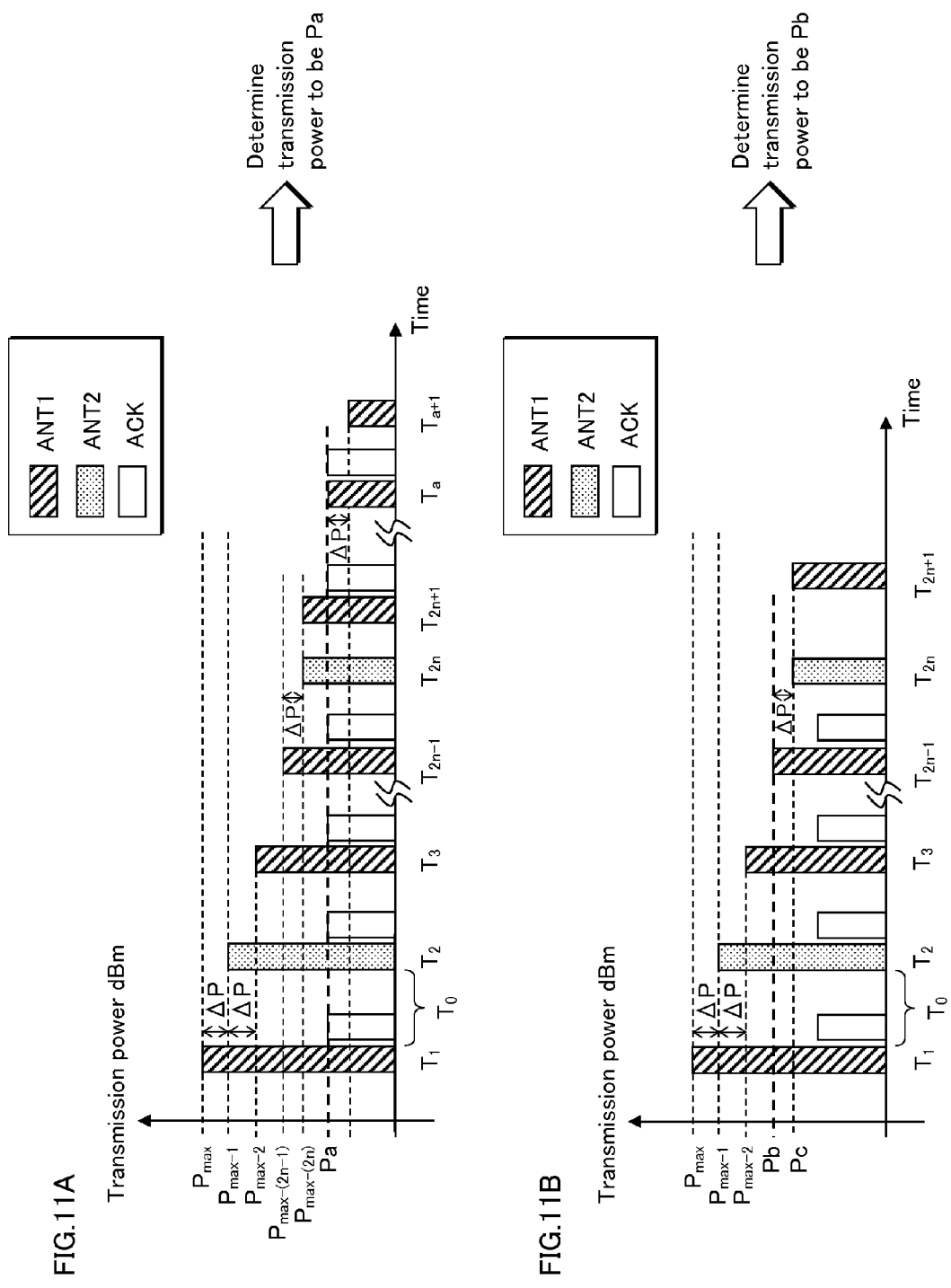
FIG. 11A and FIG. 11B are schematic diagrams illustrating examples of transmission power control processing of a communication device pertaining to embodiment 2.

In FIG. 11, ANT1 indicates the first antenna 2 and ANT2 indicates the second antenna 3. The horizontal axis of the graph indicates time and the vertical axis of the graph indicates transmission power.

In FIG. 11A, the communication device 1 transmits data at the transmission power Pmax (initial value) by using the first antenna at time T1. After data transmission, the communication device 1 waits for reception of an ACK from the slave station for an arbitrary unit of time T0. When an ACK is received, the communication device 1 switches the antenna used to the second antenna and transmits data to the slave station at a transmission power Pmax−1, which is Pmax minus the arbitrary power amount ΔP, at time T2. This processing is repeated until an ACK is not received.

At time T2n the communication device 1 transmits data at a transmission power Pmax−(2n) from the second antenna and an ACK is not received during the preceding unit of time T0, and therefore the communication device 1 switches the antenna to the first antenna and transmits data at a the transmission power Pmax−(2n) at time T2n+1.

At this time, an ACK is received, and therefore the communication device 1 transmits data by continuing to use the first antenna without switching to the second antenna, while subtracting ΔP from the transmission power, until an ACK is not received.

The communication device 1 does not receive an ACK at time Ta+1, and therefore determines that a minimum transmission power at which communication with the slave station is possible is the transmission power Pa set at time Ta immediately prior to time Ta+1, and determines that the transmission power Pa is to be used when communicating with the slave station.

At time T2$n$−1 in FIG. 11B, an ACK is received when the communication device 1 transmits data at a transmission power Pb by using the first antenna, but at time T2$n$ an ACK is not received when the communication device 1 transmits data at a transmission power that is the immediately prior transmission power Pb minus ΔP, by using the second antenna. In this case, there is still a possibility that an ACK will be received when the communication device 1 transmits data at a transmission power Pc, which is the transmission power Pb minus ΔP, by using the first antenna, and therefore the communication device 1 transmits data at the transmission power Pc at time T2$n$+1. However, in this case an ACK is not received, and therefore the determiner 11 determines that data is to be transmitted to the slave device by using a combination of the first antenna and the transmission power Pb, which is the final combination at which an ACK was received.

Modification of Embodiment 2

Figure 12:
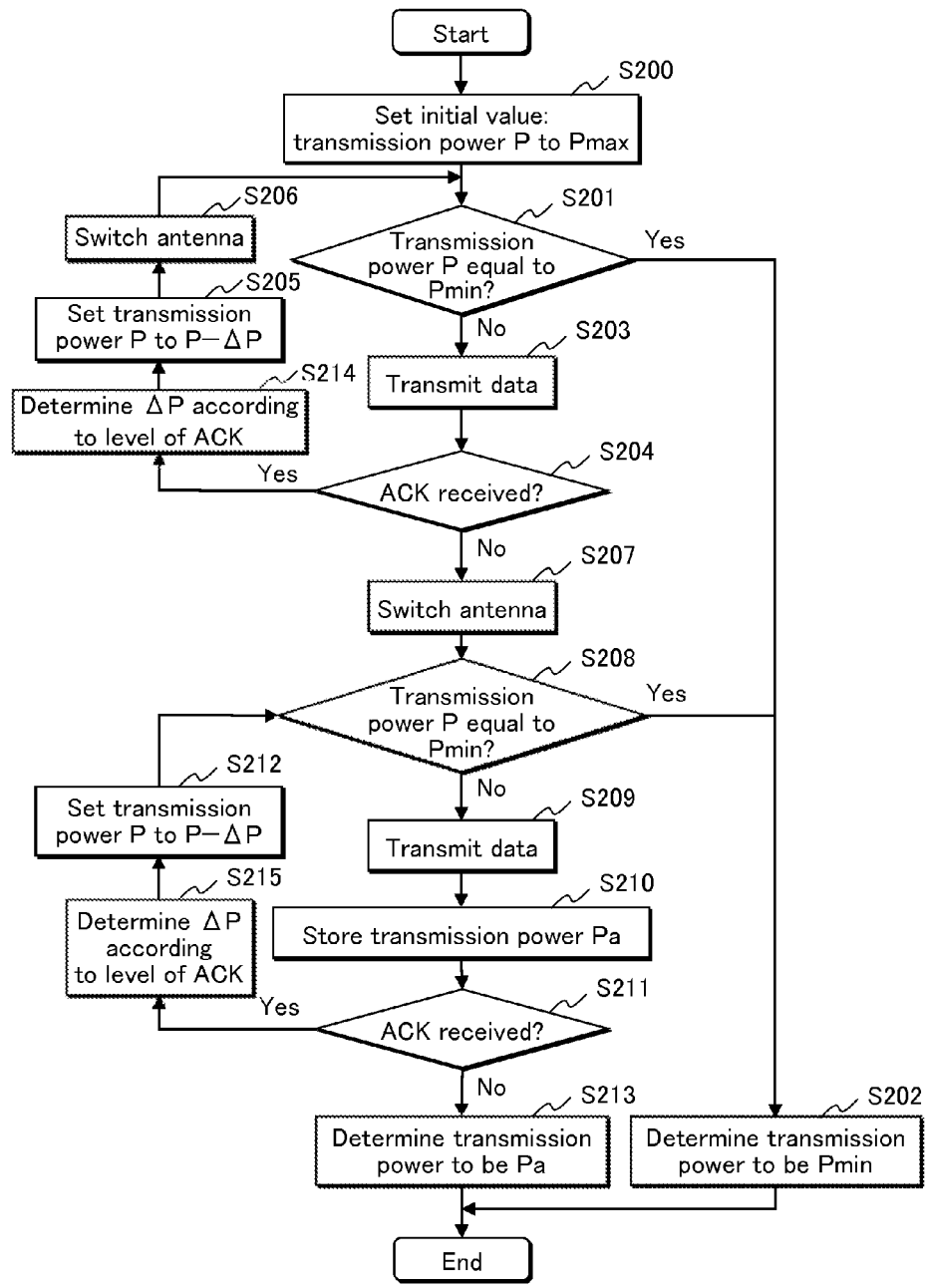
FIG. 12 is a flowchart illustrating transmission power control processing of a communication device pertaining to a modification of embodiment 2.

FIG. 12 is a flowchart illustrating transmission power control processing of the communication device 1 pertaining to a modification of embodiment 2.

Portions of FIG. 12 that differ from FIG. 10 are described, and description of steps in which identical processing is performed is omitted. FIG. 12 differs from FIG. 10 in that FIG. 12 has steps (S214 and S215) for determining magnitude of the power amount ΔP according to a reception level of an ACK from the slave station.

In S214, for example when the reception level of an ACK is high, the communication device 1 determines that the slave station is near and sets the power amount ΔP to be large. On the other hand, when the reception level of an ACK is low, the communication device 1 determines that the slave station is far and sets the power amount ΔP to be small. In other words, the power amount ΔP by which the transmission power is decreased is adjusted according to the reception level of the ACK, and therefore the transmission power can be set to as small a value as possible.

The present invention is also applicable in a case in which the communication device 1 pertaining to embodiment 2 has three or more antennas.

Embodiment 3

Figure 13:
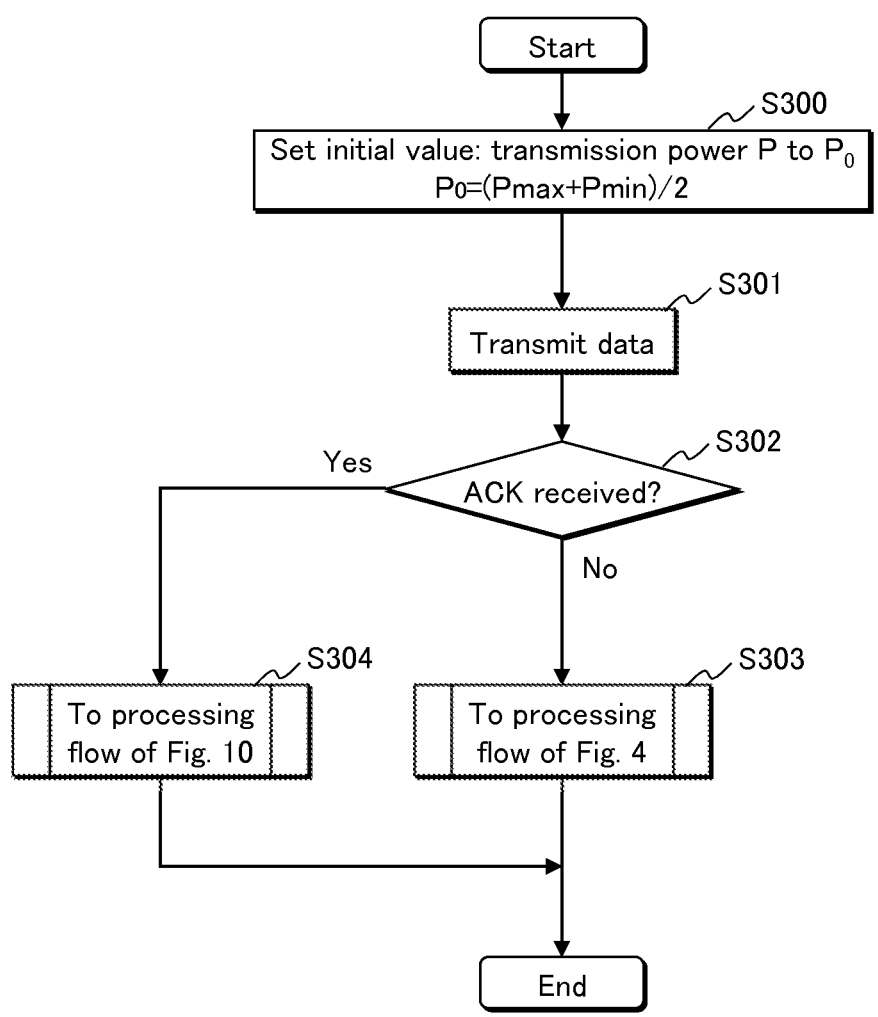
FIG. 13 is a flowchart illustrating transmission power control processing of a communication device pertaining to embodiment 3.

FIG. 13 is a flowchart illustrating transmission power control processing of the communication device 1 pertaining to embodiment 3.

First, according to the present embodiment, the determiner 11 of the communication device 1 sets the initial value P0 of the transmission power P to an intermediate value between Pmax and Pmin, calculated as (Pmax+Pmin)/2 (S300). By setting the initial value P0 in this way, the possibility of rapidly arriving at a preferred transmission power is increased.

Subsequently, the transmitter 5 transmits data to the slave station at the transmission power P, which is equal to P0, by using one of the first antenna 2 and the second antenna 3 (S301). The receiver 6 then determines whether or not an ACK is received from the slave station after the transmission of data (S302). When reception of an ACK is confirmed (Yes at S302), processing proceeds to S205 in FIG. 10 and the communication device 1 determines a transmit antenna and transmission power by switching between the first antenna and the second antenna and decreasing transmission power for transmitting data with each switch (S304). On the other hand, when reception of an ACK is not confirmed (No at S302), processing proceeds to S105 in FIG. 4 and the communication device 1 determines a transmit antenna and transmission power by switching between the first antenna and the second antenna and increasing transmission power for transmitting data with each switch (S303).

The processing flow of FIG. 4 and the processing flow of FIG. 10 are described in embodiment 1 and embodiment 2, respectively, and are therefore omitted here.

The processing flow of FIG. 4 (S303) may be the processing flow indicated in FIG. 6. The processing flow of FIG. 10 (S304) may be the processing flow indicated in FIG. 12.

Each embodiment of the present invention is described above. The communication device 1 pertaining to embodiments 1-3 and modifications thereof is described as the master station 101 illustrated in FIG. 1 and the master station 220 illustrated in FIG. 2, but the present invention is not limited in this way. The communication device 1 pertaining to embodiments 1-3 and modifications thereof may be applied to the slave station A111 and the slave station B112.

Each element of each embodiment may be implemented as a program causing a computer to execute an operation on a CPU or MPU. Further, the program may be stored in a storage medium such as read only memory (ROM) or random access memory (RAM), and may be distributed via a transmission medium such as the internet.

Each element of each embodiment is not limited to software executed on a CPU or MPU, and may typically be implemented as hardware such as a large scale integration (LSI), which is an integrated circuit. Each element may be implemented as one chip, all elements may be implemented as one chip, and a portion of one element may be implemented as one chip. Depending on the degree of integration, an integrated circuit may be referred to as an IC, a system LSI, a super LSI, an ultra LSI, etc. Further, an integrated circuit approach is not limited to LSI, and may be implemented by using a dedicated circuit or a general-purpose processor. Further, a field programmable gate array (FPGA) or a reconfigurable processor that can restructure connections and settings of circuit cells with an LSI may be used. If integrated circuit technology arises that replaces current semiconductor technology due to advances in semiconductor technology or other derivative technology, such technology may of course be used to implement integration of the function blocks.

INDUSTRIAL APPLICABILITY

The present invention is applicable to control of transmission power when a communication device having a plurality of antennas transmits data to another communication device.

REFERENCE SIGNS LIST

1 communication device
2 first antenna
3 second antenna
4 switcher
5 transmitter 6 receiver
7 antenna controller
8 communication level acquirer
9. transmission controller
10 storage
11 determiner
100 system
101 master station
111 slave station A
112 slave station B
113 slave station C
114 slave station D
200 system
210 home network
220 master station
230 solar power generator
240 battery
250 fuel cell
260 air conditioner
270 television

The invention claimed is:

1. A wireless communication device comprising:
a first antenna and a second antenna for wireless communication with another communication device;
a transmitter configured to transmit a request signal to the other communication device via one antenna out of the first antenna and the second antenna;
a receiver configured to receive a response signal transmitted from the other communication device, the response signal being transmitted in response to the other communication device receiving the request signal;
an antenna controller configured to switch between the first antenna and the second antenna upon the transmitter transmitting the request signal; and
a transmission controller configured to increase or decrease a transmission power for the transmitter to transmit the request signal when the antenna controller switches between the first antenna and the second antenna, wherein
the transmission controller increases the transmission power for transmitting the request signal when the antenna controller switches between the first antenna and the second antenna,
the transmission controller, when the receiver receives the response signal as a result of transmission of a request signal at a first transmission power via the one antenna, sets a second transmission power that is less than the first transmission power and greater than a transmission power previously used for transmitting a request signal via the one antenna, and
the transmitter transmits a request signal at the second transmission power via the one antenna.

2. The wireless communication device of claim 1, wherein
the receiver detects a signal strength of the response signal upon reception, and
the transmission controller sets the second transmission power lower for greater values of the signal strength.

3. The wireless communication device of claim 1, wherein
the antenna controller, after the receiver receives the response signal via the one antenna, sets the transmitter to transmit the request signal via the one antenna without switching to another antenna out of the first antenna and the second antenna.

4. The wireless communication device of claim 1, wherein
the transmission controller, when the receiver receives the response signal via the one antenna, sets as the second transmission power a most recently set transmission power used when another antenna out of the first antenna and the second antenna did not receive the response signal.

5. The wireless communication device of claim 1, wherein
when the receiver does not receive the response signal as a result of the transmitter transmitting the request at the second transmission power via the one antenna, the transmission controller sets a transmission power to use to communicate with the other communication device to the first transmission power, and
when the receiver receives the response signal as a result of the transmitter transmitting the request at the second transmission power via the one antenna, the transmission controller sets the transmission power to use to communicate with the other communication device to the second transmission power.

6. The wireless communication device of claim 1, wherein
an initial value of the transmission power is a power set when installing the wireless communication device.

7. The wireless communication device of claim 1, wherein
an initial value of the transmission power is a minimum power the wireless communication device outputs.

8. The wireless communication device of claim 1, wherein
an initial value of the transmission power is a maximum power the wireless communication device outputs.

9. The wireless communication device of claim 1, wherein
an initial value of the transmission power is an intermediate value of a range of transmission power the wireless communication device outputs.

10. A wireless communication device comprising:
a first antenna and a second antenna for wireless communication with another communication device;
a transmitter configured to transmit a request signal to the other communication device via one antenna out of the first antenna and the second antenna;
a receiver configured to receive a response signal transmitted from the other communication device, the response signal being transmitted in response to the other communication device receiving the request signal;
an antenna controller configured to switch between the first antenna and the second antenna upon the transmitter transmitting the request signal; and
a transmission controller configured to increase or decrease a transmission power for the transmitter to transmit the request signal when the antenna controller switches between the first antenna and the second antenna, wherein
the transmission controller, while the receiver receives the response signal via the first antenna and via the second antenna, decreases the transmission power for transmitting the request signal when the antenna controller switches between the first antenna and the second antenna, and
the transmission controller, when the receiver does not receive the response signal and the first antenna is used and when the receiver does not receive the response signal and the second antenna is used, sets a transmission power to use to communicate with the other communication device to a transmission power last set when the receiver received the response signal.

11. The wireless communication device of claim 10, wherein
when the receiver does not receive the response signal as a result of the transmitter transmitting the request signal via the one antenna at a given transmitter power, the transmitter transmits the request signal via another antenna out of the first antenna and the second antenna at a transmitter power identical to the given transmitter power and, until the receiver does not receive the response signal, transmits the request signal via the other antenna without switching to the one antenna, decreasing a transmission power used to transmit the request signal when the request signal is transmitted.

12. A wireless communication device comprising:
a first antenna and a second antenna for wireless communication with another communication device;
a transmitter configured to transmit a request signal to the other communication device via one antenna out of the first antenna and the second antenna;
a receiver configured to receive a response signal transmitted from the other communication device, the response signal being transmitted in response to the other communication device receiving the request signal;
an antenna controller configured to switch between the first antenna and the second antenna upon the transmitter transmitting the request signal; and
a transmission controller configured to increase or decrease a transmission power for the transmitter to transmit the request signal when the antenna controller switches between the first antenna and the second antenna, wherein
the transmission controller, when the receiver receives the response signal as a result of transmission of the request signal at a transmission power of the initial value, decreases the transmission power when the antenna controller switches between the first antenna and the second antenna, and, when the receiver does not receive the response signal as a result of the transmission of the request signal at the transmission power of the initial value, increases the transmission power when the antenna controller switches between the first antenna and the second antenna.

13. A transmission power control method of a wireless communication device provided with a first antenna and a second antenna for wireless communication with another communication device, the transmission power control method comprising:
transmitting a request signal to the other communication device via one antenna of the first antenna and the second antenna;
receiving a response signal transmitted from the other communication device, the response signal being transmitted in response to the other communication device receiving the request signal;
switching between the first antenna and the second antenna upon transmission of the request signal; and
increasing or decreasing a transmission power for the transmission of the request signal each time the switching between the first antenna and the second antenna is performed, wherein the transmission power for transmitting the request signal is increased when the switching between the first antenna and the second antenna is performed,
when the response signal is received as a result of transmission of a request signal at a first transmission power via the one antenna, a second transmission power is set that is less than the first transmission power and greater than a transmission power previously used for transmitting a request signal via the one antenna, and
a request signal is transmitted at the second transmission power via the one antenna.

14. An integrated circuit comprising:
a first antenna and a second antenna for wireless communication with another communication device;
a transmitter configured to transmit a request signal to the other communication device via one antenna of the first antenna and the second antenna;
a receiver configured to receive a response signal transmitted from the other communication device, the response signal being transmitted in response to the other communication device receiving the request signal;
an antenna controller configured to switch between the first antenna and the second antenna upon the transmitter transmitting the request signal; and
a transmission controller configured to increase or decrease a transmission power for the transmitter to transmit the request signal each time the antenna controller switches between the first antenna and the second antenna, wherein
the transmission controller increases the transmission power for transmitting the request signal when the antenna controller switches between the first antenna and the second antenna,
the transmission controller, when the receiver receives the response signal as a result of transmission of a request signal at a first transmission power via the one antenna, sets a second transmission power that is less than the first transmission power and greater than a transmission power previously used for transmitting a request signal via the one antenna, and
the transmitter transmits a request signal at the second transmission power via the one antenna.

15. A non-transitory, computer-readable storage medium containing a program executable by a computer to execute transmission power control processing of a wireless transmission device provided with a first antenna and a second antenna for wireless communication with another communication device, the program comprising:
transmitting a request signal to the other communication device via one antenna of the first antenna and the second antenna;
receiving a response signal transmitted from the other communication device, the response signal being transmitted in response to the other communication device receiving the request signal;
switching between the first antenna and the second antenna upon transmission of the request signal; and
increasing or decreasing a transmission power for the transmission of the request signal each time the switching between the first antenna and the second antenna is performed, wherein
the transmission power for transmitting the request signal is increased when the switching between the first antenna and the second antenna is performed, when the response signal is received as a result of transmission of a request signal at a first transmission power via the one antenna, a second transmission power is set that is less than the first transmission power and greater than a transmission power previously used for transmitting a request signal via the one antenna, and a request signal is transmitted at the second transmission power via the one antenna.

\* \* \* \* \*